Aug. 7, 1923.
W. F. SHEELEY
VEHICLE TRAFFIC SIGNAL
Filed Feb. 5, 1923
1,463,927
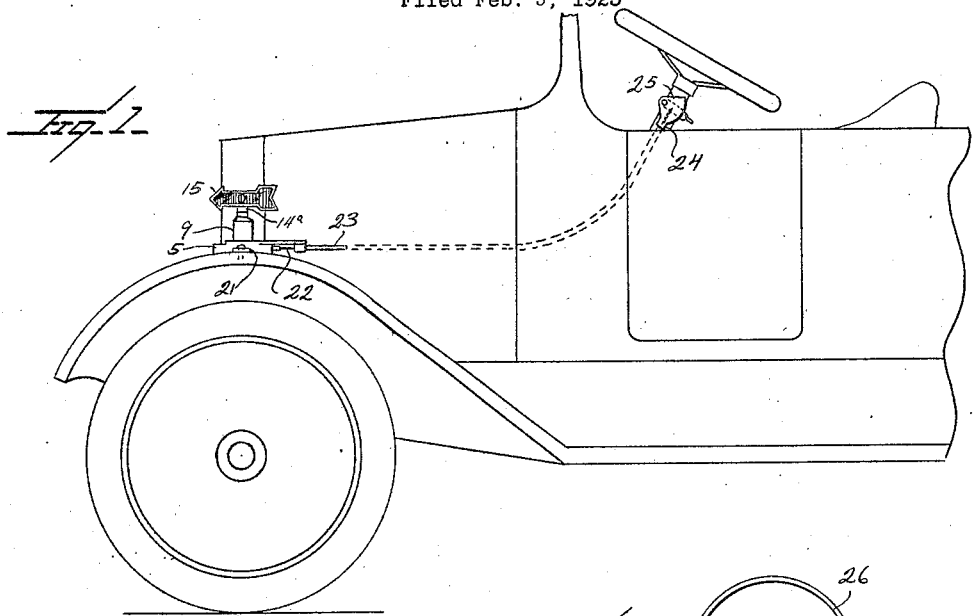
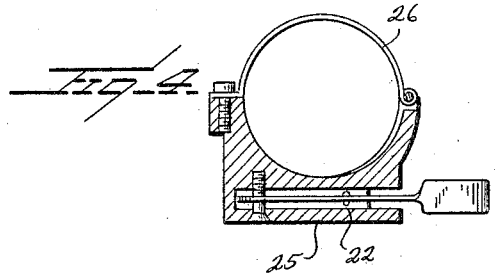
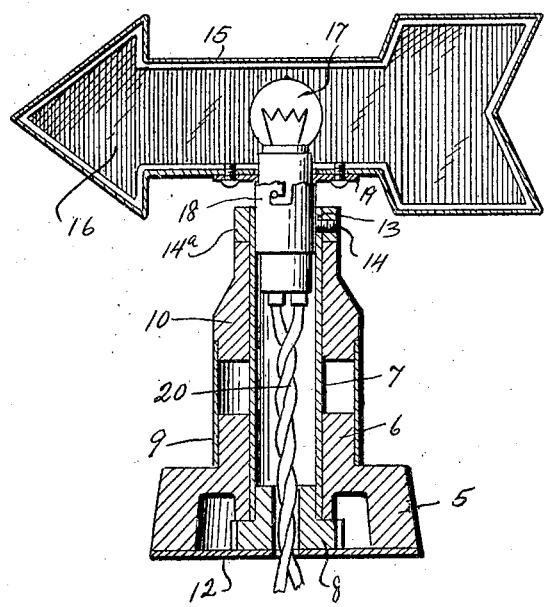
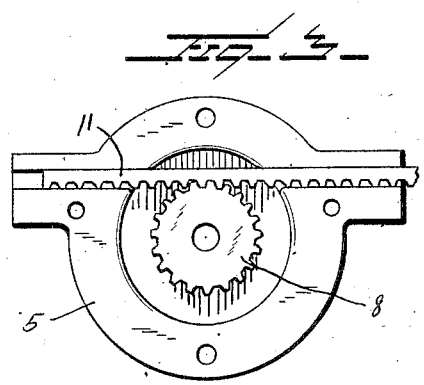
INVENTOR.
W. F. Sheeley
BY Watson E. Coleman
ATTORNEY.

Patented Aug. 7, 1923.

1,463,927

UNITED STATES PATENT OFFICE.

WILLIAM F. SHEELEY, OF GALESBURG, ILLINOIS.

VEHICLE TRAFFIC SIGNAL.

Application filed February 5, 1923. Serial No. 617,131.

*To all whom it may concern:*

Be it known that I, WILLIAM F. SHEELEY, a citizen of the United States, residing at Galesburg, in the county of Knox and State of Illinois, have invented certain new and useful Improvements in Vehicle Traffic Signals, of which the following is a specification, reference being had to the accompanying drawings.

This invention relates to certain new and useful improvements in vehicle traffic signals, and the primary object is to provide a single signal member so disposed on the vehicle and so operated as to be effectively employed to denote in a clear manner the direction in which the driver is about to proceed, when traveling ahead, with the signal member visible from both the front and rear of the vehicle, and wherein the signal member may be set to efficiently act as a parking light when the vehicle is at rest.

Various forms of vehicle signals have been proposed, some of which embodied illuminated pointers so disposed and operated as to require the use of more than one vehicle signal, thus making the devices prohibitive because of expense and labor incident to their use and installation. Also, such signals usually constituted an additional equipment, in addition to the tail and parking lights necessarily found upon vehicles. It is, accordingly, an object of the present invention to provide a signal of this character which will involve only a single illuminated signal member which not only performs the function of a direction signal but also eliminates the necessity for employing a separate parking light.

Another object of the invention is to so construct, mount and operate the rotatable pointer of the signal as to provide a generally improved signal capable of being cheaply and easily manufactured as well as placed in use without the requirement of special skill and at a minimum expense.

With the above general objects in view, the others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts throughout the several views:—

Figure 1 is a side elevation of the forward portion of an automobile showing my signal applied thereto;

Figure 2 is a vertical sectional view of the signal and its actuating means;

Figure 3 is an under side plan view of the base of the signal showing the actuating means therefor;

Figure 4 is a section through the steering column clamp showing the controlling means for the signal.

Referring more in detail to the several views, the present invention embodies a base 5 of hollow construction and formed with an upstanding sleeve 6 in which is journaled the lower end of a tubular shaft 7, a pinion 8 being horizontally disposed in the chamber of the base and having a tubular hub suitably secured in the lower end of the shaft 7. A hollow standard or tube 9 has its lower end telescoped on to the sleeve or bearing 6 and an upper bearing member 10 is provided which has its lower portion reduced and fixed in the upper end of the tube or standard 9. The upper end of the hollow shaft 7 is journaled in the bearing member 10, while the base 5 is provided with a longitudinal guide groove receiving a longitudinally reciprocable rack bar 11 whose teeth mesh with the teeth of the pinion 8 and whose ends slidably project through opposite ends of the base 5. For facilitating assembling of the parts, the base is provided with a removable bottom wall 12 which may be held in place by means of set screws or the like.

The upper end of the shaft 7 is provided with an opening 13 which is adapted to register with a set screw 14 which is threaded through a thrust bearing collar 14ª mounted upon the upper end of the shaft 7 and engaging the upper end of the bearing member 10.

A signal member is secured to the upper end of the shaft 7 and embodies a pointer 15 preferably in the shape of an arrow as shown and having light transmitting sides 16 preferably in the form of red colored glass or the like. In other words, the pointer is composed of a metallic body with light transmitting sides and midway between the ends of the pointer there is provided an opening in the bottom wall of the pointer through which an electric light bulb 17 extends so that said bulb is positioned within the pointer for illuminating the latter as will presently become apparent. The bulb 17 is detachably associated with a socket 18 of any well known or preferred construction which is adapted to be telescoped into the upper end of the shaft 7 and secured to the latter by means of the set screw 14 carried by the collar 14ª, the socket 18 being fastened to the bottom of the pointer by means of suitable screws or the like passing through a flange 19 which is rigid with the upper end of the socket 18.

The conductor wires 20 are attached to the terminals at the lower end of the socket 18 and pass downwardly through the shaft 7 and pinion 8 from which point they may extend to the battery of the vehicle or other source of electric current supply.

The present signal is adapted to be mounted upon the front left-hand mud guard of the vehicle, as shown, by means of bolts or the like passing through ears 21 of the base, and it will thus be seen that the pointer is visible from the rear of the vehicle as well as from the front thereof.

It will thus be seen that when the pointer is directed straight ahead it will indicate that the intention of the driver is to keep in a straight course. However, when the driver intends to turn to one side the rack bar 11 is moved in the proper direction for causing rotation of the pointer so that the latter will point in the direction to which the operator is about to turn, while a reverse movement of the rack bar for the desired distance will cause the pointer to point in the opposite direction in case the driver is to turn in the opposite direction. Further, as the light transmitting panels are of colored glass, the pointer may be positioned to point toward the curb when the vehicle is parked, and in this way the signal will act as a parking light.

Any suitable means may be provided for rotating the pointer in the manner described, which means is readily operable from the driver's seat. In the drawing this means is shown as embodying a flexible operating wire 22 having its forward end attached to the rear end of the rack bar 11 and extending rearwardly through a suitable guide tube 23 which has its forward end suitably supported from the base 5 and which has its opposite end fixed to a hollow sleeve 24 carried by the bracket 25 which is secured on the steering post of the vehicle beneath the steering wheel within convenient reach of the driver or chauffeur, by means of a clamp 26 or the like. The bracket 25 embodies a pair of spaced plates connected in rigid relation, with the wire 22 terminating at its rear end between these plates and connected to the intermediate portion of a suitable operating lever which is arranged between the plates of the bracket 25 and suitably pivoted to said plates of the bracket at its forward end. The rear end of the lever is twisted at right angles to provide a convenient finger piece whereby it may be readily swung for reciprocating the wire and thereby causing corresponding movement of the rack bar for rotating the pointer.

From the foregoing description it is believed that the construction and operation as well as the advantages of the present invention will be readily understood and appreciated by those skilled in the art.

Minor changes may be made without departing from the spirit and scope of the invention as claimed.

What I claim is:—

1. In a traffic signal, a base formed with a chamber and having an upstanding tubular bearing, a hollow standard telescoped onto said bearing, an upper bearing having a reduced lower end telescoped into the upper end of said standard, a hollow shaft having its end portions journaled in said bearings, a hollow pointer having light transmitting sides and provided with a depending lamp socket telescoped into the hollow shaft, a gear within said chamber having a reduced hub telescoped into the lower end of a hollow shaft, guide extensions on the base, the base being formed with guide slots extending through said extensions and intersecting the chamber, and a longitudinally movable rack bar slidable along said slots and meshing with said gear.

2. A traffic signal comprising a chambered base having an upstanding tubular bearing, a hollow standard telescoped on to said bearing, an upper bearing having a reduced lower end telescoped into the upper end of said standard, a hollow shaft having its opposite end portions journaled in said bearings, and projecting slightly above and below the latter, a thrust bearing collar arranged upon the upper end of the shaft and resting upon the upper edge of the second bearing, said hollow shaft having an opening, a set screw carried by said collar and passing through the opening of the hollow shaft, a hollow pointer having light transmitting sides and provided with a depending lamp socket telescoped into the upper ends of the hollow shaft, said set screw of the thrust bearing collar engaging the outer surface of the lamp socket, to fix the latter relative to the shaft.

3. A traffic signal comprising a chambered base having an upstanding tubular bearing, a hollow standard telescoped on to said bearing, an upper bearing having a reduced lower end telescoped into the upper end of said standard, a hollow shaft having its opposite end portions journaled in said bearings, and projecting slightly above and below the latter, a thrust bearing collar arranged upon the upper end of the shaft and resting upon the upper edge of the second bearing, said hollow shaft having an opening, a set screw carried by said collar and passing through the opening of the hollow shaft, a hollow pointer having light transmitting sides and provided with a depending lamp socket telescoped into the upper ends of the hollow shaft, said set screw of the thrust bearing collar engaging the outer surface of the lamp socket, to fix the latter relative to the shaft, said lamp socket having an annular flange upon its upper end, and means detachably engaging the bottom of the pointer and the annular flange of the lamp socket for detachably connecting the socket and the pointer, said pointer having an opening in its bottom wall concentric with the lamp socket flange through which an electric light bulb is adapted to project into the pointer when engaged with said lamp socket.

In testimony whereof I hereunto affix my signature.

WILLIAM F. SHEELEY.